US008584257B2

(12) United States Patent
Kortum et al.

(10) Patent No.: US 8,584,257 B2
(45) Date of Patent: Nov. 12, 2013

(54) METHOD AND INTERFACE FOR VIDEO CONTENT ACQUISITION SECURITY ON A SET-TOP BOX

(75) Inventors: Philip Ted Kortum, Austin, TX (US); Marc Andrew Sullivan, Austin, TX (US); James L. Cansler, Jr., Pflugerville, TX (US); Alyssa Lenorah Noll Williams, Elmhurst, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 944 days.

(21) Appl. No.: 10/915,683

(22) Filed: Aug. 10, 2004

(65) Prior Publication Data

US 2006/0037083 A1 Feb. 16, 2006

(51) Int. Cl.
*G06F 11/00* (2006.01)
(52) U.S. Cl.
USPC ........ 726/28; 726/2; 726/21; 726/27; 726/29; 726/30; 726/4
(58) Field of Classification Search
USPC ............ 726/26–30, 4, 1–2, 21; 380/241, 380; 713/182–184; 725/1–2, 25–30; 705/50, 705/64, 26
See application file for complete search history.

(56) References Cited

U.S. PATENT DOCUMENTS

| | | | |
|---|---|---|---|
| 4,243,147 | A | 1/1981 | Twitchell et al. |
| 4,356,509 | A | 10/1982 | Skerlos et al. |
| 4,768,926 | A | 9/1988 | Gilbert, Jr. |
| 4,907,079 | A | 3/1990 | Turner et al. |
| 5,126,731 | A | 6/1992 | Cromer, Jr. et al. |
| 5,163,340 | A | 11/1992 | Bender |
| 5,475,835 | A | 12/1995 | Hickey |
| 5,532,748 | A | 7/1996 | Naimpally |
| 5,541,917 | A | 7/1996 | Farris |

(Continued)

FOREIGN PATENT DOCUMENTS

| | | |
|---|---|---|
| WO | WO 99/63759 A2 | 12/1999 |
| WO | WO 00/28689 A2 | 5/2000 |

(Continued)

OTHER PUBLICATIONS

Kapinos, S., "Accenda Universal Remote Control Tartgets Needs of Elderly, Visually Impaired, Physically Challenged . . . and the Rest of Us" Innotech Systems, Inc., Press Release, Port Jefferson, NY, Dec. 15, 2002.

(Continued)

*Primary Examiner* — Edan Orgad
*Assistant Examiner* — Canh Le
(74) *Attorney, Agent, or Firm* — Toler Law Group, PC (57) ABSTRACT

A method of providing access to downloadable protected video content includes providing parental controls. The parental controls include a parental control password. Purchase controls are also provided and include a purchase control password. The purchase control password is different from the parental control password. Further, protected video content is downloaded and stored to a memory within a set top box when both the parental controls and the purchase controls are satisfied. A number of attempts to correctly input the parental control password or the purchase control password are monitored. When the number of attempts for either password exceeds a predetermined threshold, a user is prevented from further attempts to input the respective password. Moreover, the attempt to download protected video content is canceled, and further downloads of protected video content are prevented for a predetermined time period.

22 Claims, 5 Drawing Sheets

(56) References Cited

U.S. PATENT DOCUMENTS

| | | | |
|---|---|---|---|
| 5,589,892 A | 12/1996 | Knee et al. | |
| 5,592,477 A | 1/1997 | Farris et al. | |
| 5,610,916 A | 3/1997 | Kostreski et al. | |
| 5,613,012 A | 3/1997 | Hoffman et al. | |
| 5,650,831 A | 7/1997 | Farwell | |
| 5,651,332 A | 7/1997 | Moore et al. | |
| 5,656,898 A | 8/1997 | Kalina | |
| 5,675,390 A | 10/1997 | Schindler et al. | |
| 5,708,961 A | 1/1998 | Hylton et al. | |
| 5,722,041 A | 2/1998 | Freadman | |
| 5,724,106 A | 3/1998 | Autry et al. | |
| 5,729,825 A | 3/1998 | Kostreski et al. | |
| 5,734,853 A | 3/1998 | Hendricks et al. | |
| 5,774,357 A | 6/1998 | Hoffberg et al. | |
| 5,793,438 A | 8/1998 | Bedard | |
| 5,805,719 A | 9/1998 | Pare, Jr. et al. | |
| 5,818,438 A | 10/1998 | Howe et al. | |
| 5,838,384 A | 11/1998 | Schindler et al. | |
| 5,838,812 A | 11/1998 | Pare, Jr. et al. | |
| 5,864,757 A | 1/1999 | Parker | |
| 5,867,223 A | 2/1999 | Schindler et al. | |
| 5,878,141 A * | 3/1999 | Daly et al. | 705/78 |
| 5,892,508 A | 4/1999 | Howe et al. | |
| 5,900,867 A | 5/1999 | Schindler et al. | |
| 5,910,970 A | 6/1999 | Lu | |
| 5,933,498 A | 8/1999 | Schneck et al. | |
| 5,953,318 A | 9/1999 | Nattkemper et al. | |
| 5,956,024 A | 9/1999 | Strickland et al. | |
| 5,956,716 A | 9/1999 | Kenner et al. | |
| 5,969,748 A * | 10/1999 | Casement et al. | 725/27 |
| 5,970,088 A | 10/1999 | Chen | |
| 5,987,061 A | 11/1999 | Chen | |
| 5,990,927 A | 11/1999 | Hendricks et al. | |
| 5,995,155 A | 11/1999 | Schindler et al. | |
| 5,999,518 A | 12/1999 | Nattkemper et al. | |
| 5,999,563 A | 12/1999 | Polley et al. | |
| 6,002,722 A | 12/1999 | Wu | |
| 6,014,184 A | 1/2000 | Knee et al. | |
| 6,021,158 A | 2/2000 | Schurr et al. | |
| 6,021,167 A | 2/2000 | Wu | |
| 6,028,600 A | 2/2000 | Rosin et al. | |
| 6,029,045 A | 2/2000 | Picco et al. | |
| 6,038,251 A | 3/2000 | Chen | |
| 6,044,107 A | 3/2000 | Gatherer et al. | |
| 6,052,120 A | 4/2000 | Nahi et al. | |
| 6,055,268 A | 4/2000 | Timm et al. | |
| 6,072,483 A | 6/2000 | Rosin et al. | |
| 6,084,584 A | 7/2000 | Nahi et al. | |
| 6,111,582 A | 8/2000 | Jenkins | |
| 6,118,498 A | 9/2000 | Reitmeier | |
| 6,122,660 A | 9/2000 | Baransky et al. | |
| 6,124,799 A | 9/2000 | Parker | |
| 6,137,839 A | 10/2000 | Mannering et al. | |
| 6,144,401 A * | 11/2000 | Casement et al. | 725/30 |
| 6,163,272 A | 12/2000 | Goode et al. | |
| 6,166,734 A | 12/2000 | Nahi et al. | |
| 6,181,335 B1 | 1/2001 | Hendricks et al. | |
| 6,192,282 B1 | 2/2001 | Smith et al. | |
| 6,195,692 B1 | 2/2001 | Hsu | |
| 6,215,483 B1 | 4/2001 | Zigmond | |
| 6,237,022 B1 | 5/2001 | Bruck et al. | |
| 6,243,366 B1 | 6/2001 | Bradley et al. | |
| 6,252,588 B1 | 6/2001 | Dawson | |
| 6,252,989 B1 | 6/2001 | Geisler et al. | |
| 6,260,192 B1 | 7/2001 | Rosin et al. | |
| 6,269,394 B1 | 7/2001 | Kenner et al. | |
| 6,275,268 B1 | 8/2001 | Ellis et al. | |
| 6,275,989 B1 | 8/2001 | Broadwin et al. | |
| 6,281,813 B1 | 8/2001 | Vierthaler et al. | |
| 6,286,142 B1 | 9/2001 | Ehreth | |
| 6,295,057 B1 | 9/2001 | Rosin et al. | |
| 6,311,214 B1 | 10/2001 | Rhoads | |
| 6,314,409 B2 | 11/2001 | Schneck et al. | |
| 6,344,882 B1 | 2/2002 | Shim et al. | |
| 6,357,043 B1 | 3/2002 | Ellis et al. | |
| 6,359,636 B1 | 3/2002 | Schindler et al. | |
| 6,363,149 B1 | 3/2002 | Candelore | |
| 6,385,693 B1 | 5/2002 | Gerszberg et al. | |
| 6,396,480 B1 | 5/2002 | Schindler et al. | |
| 6,396,531 B1 | 5/2002 | Gerszberg et al. | |
| 6,396,544 B1 | 5/2002 | Schindler et al. | |
| 6,397,387 B1 | 5/2002 | Rosin et al. | |
| 6,400,407 B1 | 6/2002 | Zigmond et al. | |
| 6,411,307 B1 | 6/2002 | Rosin et al. | |
| 6,442,285 B2 | 8/2002 | Rhoads et al. | |
| 6,442,549 B1 | 8/2002 | Schneider | |
| 6,445,398 B1 * | 9/2002 | Gerba et al. | 715/721 |
| 6,449,601 B1 | 9/2002 | Friedland et al. | |
| 6,450,407 B1 | 9/2002 | Freeman et al. | |
| 6,460,075 B2 | 10/2002 | Krueger et al. | |
| 6,463,585 B1 | 10/2002 | Hendricks et al. | |
| 6,481,011 B1 | 11/2002 | Lemmons | |
| 6,486,892 B1 | 11/2002 | Stern | |
| 6,492,913 B2 | 12/2002 | Vierthaler et al. | |
| 6,496,983 B1 | 12/2002 | Schindler et al. | |
| 6,502,242 B1 | 12/2002 | Howe et al. | |
| 6,505,348 B1 * | 1/2003 | Knowles et al. | 725/49 |
| 6,510,519 B2 | 1/2003 | Wasilewski et al. | |
| 6,515,680 B1 | 2/2003 | Hendricks et al. | |
| 6,516,467 B1 | 2/2003 | Schindler et al. | |
| 6,519,011 B1 | 2/2003 | Shendar | |
| 6,522,769 B1 | 2/2003 | Rhoads et al. | |
| 6,526,577 B1 | 2/2003 | Knudson et al. | |
| 6,529,949 B1 | 3/2003 | Getsin et al. | |
| 6,535,590 B2 | 3/2003 | Tidwell et al. | |
| 6,538,704 B1 | 3/2003 | Grabb et al. | |
| 6,542,740 B1 | 4/2003 | Olgaard et al. | |
| 6,557,030 B1 | 4/2003 | Hoang | |
| 6,567,982 B1 | 5/2003 | Howe et al. | |
| 6,587,873 B1 | 7/2003 | Nobakht et al. | |
| 6,598,231 B1 | 7/2003 | Basawapatna et al. | |
| 6,599,199 B1 | 7/2003 | Hapshie | |
| 6,607,136 B1 | 8/2003 | Atsmon et al. | |
| 6,609,253 B1 | 8/2003 | Swix et al. | |
| 6,611,537 B1 | 8/2003 | Edens et al. | |
| 6,614,987 B1 | 9/2003 | Ismail et al. | |
| 6,622,148 B1 | 9/2003 | Noble et al. | |
| 6,622,307 B1 | 9/2003 | Ho | |
| 6,631,523 B1 | 10/2003 | Matthews, III et al. | |
| 6,640,239 B1 | 10/2003 | Gidwani | |
| 6,643,495 B1 | 11/2003 | Gallery et al. | |
| 6,643,684 B1 | 11/2003 | Malkin et al. | |
| 6,650,761 B1 | 11/2003 | Rodriguez et al. | |
| 6,658,568 B1 | 12/2003 | Ginter et al. | |
| 6,678,215 B1 | 1/2004 | Treyz et al. | |
| 6,678,733 B1 | 1/2004 | Brown et al. | |
| 6,690,392 B1 | 2/2004 | Wugoski | |
| 6,693,236 B1 | 2/2004 | Gould et al. | |
| 6,701,523 B1 * | 3/2004 | Hancock et al. | 725/25 |
| 6,704,931 B1 | 3/2004 | Schaffer et al. | |
| 6,714,264 B1 | 3/2004 | Kempisty | |
| 6,725,281 B1 | 4/2004 | Zintel et al. | |
| 6,731,393 B1 | 5/2004 | Currans et al. | |
| 6,732,179 B1 | 5/2004 | Brown et al. | |
| 6,745,223 B1 | 6/2004 | Nobakht et al. | |
| 6,745,392 B1 | 6/2004 | Basawapatna et al. | |
| 6,754,206 B1 | 6/2004 | Nattkemper et al. | |
| 6,756,997 B1 | 6/2004 | Ward, III et al. | |
| 6,760,918 B2 | 7/2004 | Rodriguez et al. | |
| 6,763,226 B1 | 7/2004 | McZeal, Jr. | |
| 6,765,557 B1 | 7/2004 | Segal et al. | |
| 6,766,305 B1 | 7/2004 | Fucarile et al. | |
| 6,769,128 B1 | 7/2004 | Knee et al. | |
| 6,771,317 B2 | 8/2004 | Ellis et al. | |
| 6,773,344 B1 | 8/2004 | Gabai et al. | |
| 6,778,559 B2 | 8/2004 | Hyakutake | |
| 6,779,004 B1 | 8/2004 | Zintel | |
| 6,781,518 B1 | 8/2004 | Hayes et al. | |
| 6,784,804 B1 | 8/2004 | Hayes et al. | |
| 6,785,716 B1 | 8/2004 | Nobakht | |
| 6,788,709 B1 | 9/2004 | Hyakutake | |
| 6,804,824 B1 | 10/2004 | Potrebic et al. | |
| 6,826,775 B1 | 11/2004 | Howe et al. | |
| 6,828,993 B1 | 12/2004 | Hendricks et al. | |

(56) References Cited

U.S. PATENT DOCUMENTS

| | | | |
|---|---|---|---|
| 6,909,874 B2 | 6/2005 | Holtz et al. | |
| 6,922,843 B1* | 7/2005 | Herrington et al. | 725/30 |
| 6,938,021 B2 | 8/2005 | Shear et al. | |
| 8,006,262 B2* | 8/2011 | Rodriguez et al. | 725/37 |
| 2001/0011261 A1 | 8/2001 | Mullen-Schultz | |
| 2001/0016945 A1 | 8/2001 | Inoue | |
| 2001/0016946 A1 | 8/2001 | Inoue | |
| 2001/0034664 A1 | 10/2001 | Brunson | |
| 2001/0038033 A1* | 11/2001 | Habib | 235/375 |
| 2001/0044794 A1 | 11/2001 | Nasr et al. | |
| 2001/0048677 A1 | 12/2001 | Boys | |
| 2001/0049826 A1 | 12/2001 | Wilf | |
| 2001/0052077 A1* | 12/2001 | Fung et al. | 713/184 |
| 2001/0054008 A1 | 12/2001 | Miller et al. | |
| 2001/0054009 A1 | 12/2001 | Miller et al. | |
| 2001/0054067 A1 | 12/2001 | Miller et al. | |
| 2001/0056350 A1 | 12/2001 | Calderone et al. | |
| 2002/0001303 A1 | 1/2002 | Boys | |
| 2002/0001310 A1 | 1/2002 | Mai et al. | |
| 2002/0002496 A1 | 1/2002 | Miller et al. | |
| 2002/0003166 A1 | 1/2002 | Miller et al. | |
| 2002/0007307 A1 | 1/2002 | Miller et al. | |
| 2002/0007313 A1 | 1/2002 | Mai et al. | |
| 2002/0007485 A1 | 1/2002 | Rodriguez et al. | |
| 2002/0010639 A1 | 1/2002 | Howey et al. | |
| 2002/0010745 A1 | 1/2002 | Schneider | |
| 2002/0010935 A1 | 1/2002 | Sitnik | |
| 2002/0016736 A1 | 2/2002 | Cannon et al. | |
| 2002/0022963 A1 | 2/2002 | Miller et al. | |
| 2002/0022970 A1 | 2/2002 | Noll et al. | |
| 2002/0022992 A1 | 2/2002 | Miller et al. | |
| 2002/0022993 A1 | 2/2002 | Miller et al. | |
| 2002/0022994 A1 | 2/2002 | Miller et al. | |
| 2002/0022995 A1 | 2/2002 | Miller et al. | |
| 2002/0023959 A1 | 2/2002 | Miller et al. | |
| 2002/0026357 A1 | 2/2002 | Miller et al. | |
| 2002/0026358 A1 | 2/2002 | Miller et al. | |
| 2002/0026369 A1 | 2/2002 | Miller et al. | |
| 2002/0026475 A1 | 2/2002 | Marmor | |
| 2002/0029181 A1 | 3/2002 | Miller et al. | |
| 2002/0030105 A1 | 3/2002 | Miller et al. | |
| 2002/0032603 A1 | 3/2002 | Yeiser | |
| 2002/0035404 A1 | 3/2002 | Ficco et al. | |
| 2002/0040475 A1 | 4/2002 | Yap et al. | |
| 2002/0042915 A1 | 4/2002 | Kubischta et al. | |
| 2002/0046093 A1 | 4/2002 | Miller et al. | |
| 2002/0049635 A1 | 4/2002 | Mai et al. | |
| 2002/0054087 A1 | 5/2002 | Noll et al. | |
| 2002/0054750 A1 | 5/2002 | Ficco et al. | |
| 2002/0059163 A1 | 5/2002 | Smith | |
| 2002/0059425 A1 | 5/2002 | Belfiore et al. | |
| 2002/0059599 A1 | 5/2002 | Schein et al. | |
| 2002/0065717 A1 | 5/2002 | Miller et al. | |
| 2002/0067438 A1 | 6/2002 | Baldock | |
| 2002/0069220 A1 | 6/2002 | Tran | |
| 2002/0069282 A1 | 6/2002 | Reisman | |
| 2002/0069294 A1 | 6/2002 | Herkersdorf et al. | |
| 2002/0072970 A1 | 6/2002 | Miller et al. | |
| 2002/0078442 A1 | 6/2002 | Reyes et al. | |
| 2002/0097261 A1 | 7/2002 | Gottfurcht et al. | |
| 2002/0099842 A1* | 7/2002 | Jennings et al. | 709/231 |
| 2002/0106119 A1 | 8/2002 | Foran et al. | |
| 2002/0112239 A1 | 8/2002 | Goldman | |
| 2002/0116392 A1 | 8/2002 | McGrath et al. | |
| 2002/0124055 A1 | 9/2002 | Reisman | |
| 2002/0128061 A1 | 9/2002 | Blanco | |
| 2002/0129094 A1 | 9/2002 | Reisman | |
| 2002/0133402 A1 | 9/2002 | Faber et al. | |
| 2002/0138840 A1 | 9/2002 | Schein et al. | |
| 2002/0142750 A1* | 10/2002 | Gill, III | 455/406 |
| 2002/0152264 A1 | 10/2002 | Yamasaki | |
| 2002/0169611 A1 | 11/2002 | Guerra et al. | |
| 2002/0170063 A1 | 11/2002 | Ansari et al. | |
| 2002/0173344 A1 | 11/2002 | Cupps et al. | |
| 2002/0184159 A1* | 12/2002 | Tadayon et al. | 705/54 |
| 2002/0188955 A1 | 12/2002 | Thompson et al. | |
| 2002/0193997 A1 | 12/2002 | Fitzpatrick et al. | |
| 2002/0194601 A1 | 12/2002 | Perkes et al. | |
| 2002/0198874 A1 | 12/2002 | Nasr et al. | |
| 2003/0005445 A1 | 1/2003 | Schein et al. | |
| 2003/0005453 A1* | 1/2003 | Rodriguez et al. | 725/87 |
| 2003/0009771 A1 | 1/2003 | Chang | |
| 2003/0012365 A1 | 1/2003 | Goodman | |
| 2003/0014367 A1* | 1/2003 | Tubinis | 705/64 |
| 2003/0014750 A1 | 1/2003 | Kamen | |
| 2003/0018975 A1 | 1/2003 | Stone | |
| 2003/0023435 A1 | 1/2003 | Josephson | |
| 2003/0023440 A1 | 1/2003 | Chu | |
| 2003/0028890 A1 | 2/2003 | Swart et al. | |
| 2003/0033416 A1 | 2/2003 | Schwartz | |
| 2003/0043915 A1 | 3/2003 | Costa et al. | |
| 2003/0046091 A1 | 3/2003 | Arneson et al. | |
| 2003/0046689 A1 | 3/2003 | Gaos | |
| 2003/0055785 A1 | 3/2003 | Lahiri | |
| 2003/0056223 A1 | 3/2003 | Costa et al. | |
| 2003/0058277 A1 | 3/2003 | Bowman-Amuah | |
| 2003/0061611 A1 | 3/2003 | Pendakur | |
| 2003/0071792 A1 | 4/2003 | Safadi | |
| 2003/0088784 A1* | 5/2003 | Ginter et al. | 713/189 |
| 2003/0093793 A1 | 5/2003 | Gutta | |
| 2003/0100340 A1 | 5/2003 | Cupps et al. | |
| 2003/0110161 A1 | 6/2003 | Schneider | |
| 2003/0110503 A1 | 6/2003 | Perkes | |
| 2003/0126136 A1 | 7/2003 | Omoigui | |
| 2003/0135771 A1 | 7/2003 | Cupps et al. | |
| 2003/0141987 A1 | 7/2003 | Hayes | |
| 2003/0145321 A1 | 7/2003 | Bates et al. | |
| 2003/0149989 A1 | 8/2003 | Hunter et al. | |
| 2003/0151621 A1* | 8/2003 | McEvilly et al. | 345/744 |
| 2003/0153353 A1 | 8/2003 | Cupps et al. | |
| 2003/0153354 A1 | 8/2003 | Cupps et al. | |
| 2003/0159026 A1 | 8/2003 | Cupps et al. | |
| 2003/0160830 A1 | 8/2003 | DeGross | |
| 2003/0163601 A1 | 8/2003 | Cupps et al. | |
| 2003/0163666 A1 | 8/2003 | Cupps et al. | |
| 2003/0163811 A1* | 8/2003 | Luehrs | 725/25 |
| 2003/0172380 A1 | 9/2003 | Kikinis | |
| 2003/0182237 A1 | 9/2003 | Costa et al. | |
| 2003/0182420 A1 | 9/2003 | Jones et al. | |
| 2003/0185232 A1 | 10/2003 | Moore et al. | |
| 2003/0187641 A1 | 10/2003 | Moore et al. | |
| 2003/0187646 A1 | 10/2003 | Smyers et al. | |
| 2003/0187800 A1 | 10/2003 | Moore et al. | |
| 2003/0189509 A1 | 10/2003 | Hayes et al. | |
| 2003/0189589 A1 | 10/2003 | LeBlanc et al. | |
| 2003/0194141 A1 | 10/2003 | Kortum et al. | |
| 2003/0194142 A1 | 10/2003 | Kortum et al. | |
| 2003/0208396 A1 | 11/2003 | Miller et al. | |
| 2003/0208758 A1 | 11/2003 | Schein et al. | |
| 2003/0226044 A1 | 12/2003 | Cupps et al. | |
| 2003/0226145 A1 | 12/2003 | Marsh | |
| 2003/0229898 A1* | 12/2003 | Babu et al. | 725/87 |
| 2003/0229900 A1 | 12/2003 | Reisman | |
| 2004/0003041 A1 | 1/2004 | Moore et al. | |
| 2004/0003403 A1 | 1/2004 | Marsh | |
| 2004/0006769 A1 | 1/2004 | Ansari et al. | |
| 2004/0006772 A1 | 1/2004 | Ansari et al. | |
| 2004/0010602 A1 | 1/2004 | Van Vleck et al. | |
| 2004/0015985 A1* | 1/2004 | Kweon | 725/30 |
| 2004/0015997 A1 | 1/2004 | Ansari et al. | |
| 2004/0030750 A1 | 2/2004 | Moore et al. | |
| 2004/0031058 A1 | 2/2004 | Reisman | |
| 2004/0031856 A1 | 2/2004 | Atsmon et al. | |
| 2004/0034877 A1 | 2/2004 | Nogues | |
| 2004/0049728 A1 | 3/2004 | Langford | |
| 2004/0064351 A1 | 4/2004 | Mikurak | |
| 2004/0068740 A1 | 4/2004 | Fukuda et al. | |
| 2004/0068753 A1 | 4/2004 | Robertson et al. | |
| 2004/0070491 A1 | 4/2004 | Huang et al. | |
| 2004/0073918 A1 | 4/2004 | Ferman et al. | |
| 2004/0098571 A1 | 5/2004 | Falcon | |
| 2004/0107125 A1 | 6/2004 | Guheen et al. | |
| 2004/0107439 A1 | 6/2004 | Hassell et al. | |
| 2004/0111745 A1 | 6/2004 | Schein et al. | |

(56) References Cited

U.S. PATENT DOCUMENTS

| | | | |
|---|---|---|---|
| 2004/0111754 A1* | 6/2004 | Bushey et al. | 725/115 |
| 2004/0111756 A1 | 6/2004 | Stuckman et al. | |
| 2004/0117813 A1 | 6/2004 | Karaoguz et al. | |
| 2004/0117824 A1 | 6/2004 | Karaoguz et al. | |
| 2004/0117831 A1* | 6/2004 | Ellis et al. | 725/53 |
| 2004/0123325 A1* | 6/2004 | Ellis et al. | 725/91 |
| 2004/0128342 A1 | 7/2004 | Maes et al. | |
| 2004/0139173 A1 | 7/2004 | Karaoguz et al. | |
| 2004/0143600 A1 | 7/2004 | Musgrove et al. | |
| 2004/0143652 A1 | 7/2004 | Grannan et al. | |
| 2004/0148408 A1 | 7/2004 | Nadarajah | |
| 2004/0150676 A1 | 8/2004 | Gottfurcht et al. | |
| 2004/0183839 A1 | 9/2004 | Gottfurcht et al. | |
| 2004/0194136 A1 | 9/2004 | Finseth et al. | |
| 2004/0198386 A1 | 10/2004 | Dupray | |
| 2004/0201600 A1 | 10/2004 | Kakivaya et al. | |
| 2004/0204998 A1* | 10/2004 | Shah et al. | 705/16 |
| 2004/0210633 A1 | 10/2004 | Brown et al. | |
| 2004/0210935 A1 | 10/2004 | Schein et al. | |
| 2004/0213271 A1 | 10/2004 | Lovy et al. | |
| 2004/0221302 A1 | 11/2004 | Ansari et al. | |
| 2004/0223485 A1 | 11/2004 | Arellano et al. | |
| 2004/0226035 A1 | 11/2004 | Hauser, Jr. | |
| 2004/0226045 A1 | 11/2004 | Nadarajah | |
| 2004/0239624 A1 | 12/2004 | Ramian | |
| 2004/0252119 A1 | 12/2004 | Hunleth et al. | |
| 2004/0252120 A1 | 12/2004 | Hunleth et al. | |
| 2004/0252769 A1 | 12/2004 | Costa et al. | |
| 2004/0252770 A1 | 12/2004 | Costa et al. | |
| 2004/0260407 A1 | 12/2004 | Wimsatt | |
| 2004/0261116 A1 | 12/2004 | McKeown et al. | |
| 2004/0267729 A1 | 12/2004 | Swaminathan et al. | |
| 2004/0267880 A1* | 12/2004 | Patiejunas | 709/203 |
| 2004/0268393 A1 | 12/2004 | Hunleth et al. | |
| 2005/0027851 A1 | 2/2005 | McKeown et al. | |
| 2005/0038814 A1 | 2/2005 | Iyengar et al. | |
| 2005/0044280 A1 | 2/2005 | Reisman | |
| 2005/0049934 A1* | 3/2005 | Nakayama et al. | 705/26 |
| 2005/0097612 A1 | 5/2005 | Pearson et al. | |
| 2005/0120373 A1* | 6/2005 | Thomas et al. | 725/58 |
| 2005/0132295 A1 | 6/2005 | Noll et al. | |
| 2005/0195961 A1 | 9/2005 | Pasquale et al. | |
| 2006/0010467 A1* | 1/2006 | Segel | 725/34 |
| 2007/0033419 A1* | 2/2007 | Kocher et al. | 713/193 |

FOREIGN PATENT DOCUMENTS

| | | |
|---|---|---|
| WO | WO 01/60066 A1 | 8/2001 |
| WO | WO 02/17627 A2 | 2/2002 |
| WO | WO 02/058382 A1 | 7/2002 |
| WO | WO 03/003710 A2 | 1/2003 |
| WO | WO 03/025726 A1 | 3/2003 |
| WO | WO 2004/018060 A2 | 3/2004 |
| WO | WO 2004/032514 A1 | 4/2004 |
| WO | WO 2004/062279 A1 | 7/2004 |
| WO | WO 2005/045554 A2 | 5/2005 |

OTHER PUBLICATIONS

U.S. Appl. No. 10/752,301, filed Jan. 6, 2004.
U.S. Appl. No. 11/158,926, filed Jun. 22, 2005.
U.S. Appl. No. 10/929,888, filed Aug. 26, 2004.
U.S. Appl. No. 10/915,684, filed Aug. 10, 2004.
U.S. Appl. No. 10/960,771, filed Oct. 7, 2004.
U.S. Appl. No. 10/901,921, filed Jul. 29, 2004.
U.S. Appl. No. 11/148,967, filed Jun. 9, 2005.
U.S. Appl. No. 11/001,676, filed Dec. 1, 2004.
U.S. Appl. No. 10/993,411, filed Nov. 19, 2004.
U.S. Appl. No. 11/179,048, filed Jul. 11, 2005.
U.S. Appl. No. 11/001,683, filed Dec. 1, 2004.
U.S. Appl. No. 11/005,496, filed Dec. 6, 2004.
U.S. Appl. No. 11/049,629, filed Feb. 2, 2005.
U.S. Appl. No. 11/043,443, filed Jan. 26, 2005.
U.S. Appl. No. 11/057,858, filed Feb. 14, 2005.
U.S. Appl. No. 11/064,775, filed Feb. 24, 2005.
U.S. Appl. No. 11/140,616, filed May 27, 2005.
U.S. Appl. No. 11/057,859, filed Feb. 14, 2005.
U.S. Appl. No. 11/093,736, filed Mar. 30, 2005.
U.S. Appl. No. 11/191,154, filed Jul. 27, 2005.
U.S. Appl. No. 11/158,892, filed Jun. 22, 2005.
U.S. Appl. No. 11/106,361, filed Apr. 14, 2005.
U.S. Appl. No. 11/158,927, filed Jun. 22, 2005.
U.S. Appl. No. 10/696,395, filed Oct. 29, 2003.
U.S. Appl. No. 11/077,167, filed Mar. 10, 2005.
U.S. Appl. No. 11/034,223, filed Jan. 12, 2005.
U.S. Appl. No. 11/051,553, filed Feb. 4, 2005.
U.S. Appl. No. 11/046,191, filed Jan. 28, 2005.
U.S. Appl. No. 11/052,006, filed Feb. 4, 2005.
U.S. Appl. No. 11/039,063, filed Jan. 20, 2005.
U.S. Appl. No. 11/037,951, filed Jan. 20, 2005.
U.S. Appl. No. 11/166,785, filed Jun. 24, 2005.
U.S. Appl. No. 11/166,908, filed Jun. 24, 2005.
U.S. Appl. No. 11/166,907, filed Jun. 24, 2005.

* cited by examiner

METHOD AND INTERFACE FOR VIDEO CONTENT ACQUISITION SECURITY ON A SET-TOP BOX

FIELD OF THE DISCLOSURE

The present disclosure relates generally to video content security using set top boxes.

BACKGROUND

For years, televisions have been a staple of consumer electronics sales. As such, a large majority of households in the United States owns at least one television. Providing content to those televisions is a lucrative business and there are numerous types of television content to choose from. For example, viewers can subscribe to digital broadband television networks and digital satellite television networks in order to receive standard digital television content or high definition television content via a broadband connection or a satellite connection. In addition, many companies now offer digital video recorders (DVRs) that can be incorporated into standard set top boxes. A DVR can be used to record digital television content transmitted to the set top box.

Many service providers also offer streaming video content and pre-cache video content in order to provide a user with content that is tailored to his or her needs or tastes. A user can simply order video content, e.g., a movie, and the video content is downloaded to a set top box for display at a television. A standard set top box typically may not include security for the control of purchased content or it may include a single global password that controls all content access functions. Many times the global password is a default password, such as 1-2-3-4, that is never reset by the master account holder. Thus, protected video content may be easily downloaded and saved at the set top box.

Accordingly, there is a need for an improved method and system for video content acquisition security.

BRIEF DESCRIPTION OF THE DRAWINGS

The present invention is pointed out with particularity in the appended claims. However, other features are described in the following detailed description in conjunction with the accompanying drawings in which:

DETAILED DESCRIPTION OF THE DRAWINGS

A method of providing access to downloadable protected video content includes providing parental controls. The parental controls include a parental control password. Purchase controls are also provided and include a purchase control password. The purchase control password is different from the parental control password. Further, protected video content is downloaded and stored to a memory within a set top box when both the parental controls and the purchase controls are satisfied.

In a particular embodiment, the method further includes detecting when parental controls are active. Thereafter, a rating of the protected video content is determined. When the rating exceeds a threshold rating, a parental control authorization screen is displayed. Further, a parental control password is received and verified. Access to the protected video content is denied when the parental control password is incorrect. Moreover, a number of attempts to correctly input the parental control password is monitored. When the number of attempts exceeds a predetermined threshold, a user is prevented from further attempts to input the parental control password, the attempt to download protected video content is canceled, and further downloads of protected video content are prevented for a predetermined time period.

The method further includes detecting when the purchase controls are active and determining when a spending limit has been reached. When the spending limit is reached, the attempt to download the protected video content is canceled and further downloads of protected video content are prevented for a predetermined time period. Further, any additional downloads of protected video content can be prevented until the spending limit is waived, e.g., by a master user or a content provider.

In an illustrative embodiment, the method can also include displaying a purchase control authorization screen. Next, a purchase control password can be received and verified. Access to the protected video file is denied when the purchase control password is incorrect. Also, a number of attempts to correctly input the correct purchase control password is monitored. When the number of attempts exceeds a predetermined threshold, a user is prevented from further attempting to input the purchase control password and the present attempt to download the protected video file is canceled. Further, when the number of attempts exceeds a predetermined threshold, all attempts to download protected video content are prevented for a predetermined time period.

In another embodiment, a device is provided for managing acquisition of video content. The device includes a processor that has a computer readable medium. A computer program is embedded within the computer readable medium. The computer program includes instructions to prevent downloading of protected video content after a predetermined spending limit is reached.

In yet another embodiment, a system for managing video content is provided. The system includes a display device, a remote control, and a set top box that is coupled to the display device and responsive to the remote control. The set top box includes a processor that has a computer readable medium. Moreover, the computer readable medium stores a user defined spending limit. When the user defined spending limit is exceeded, downloading of protected video content is blocked.

Figure 1:
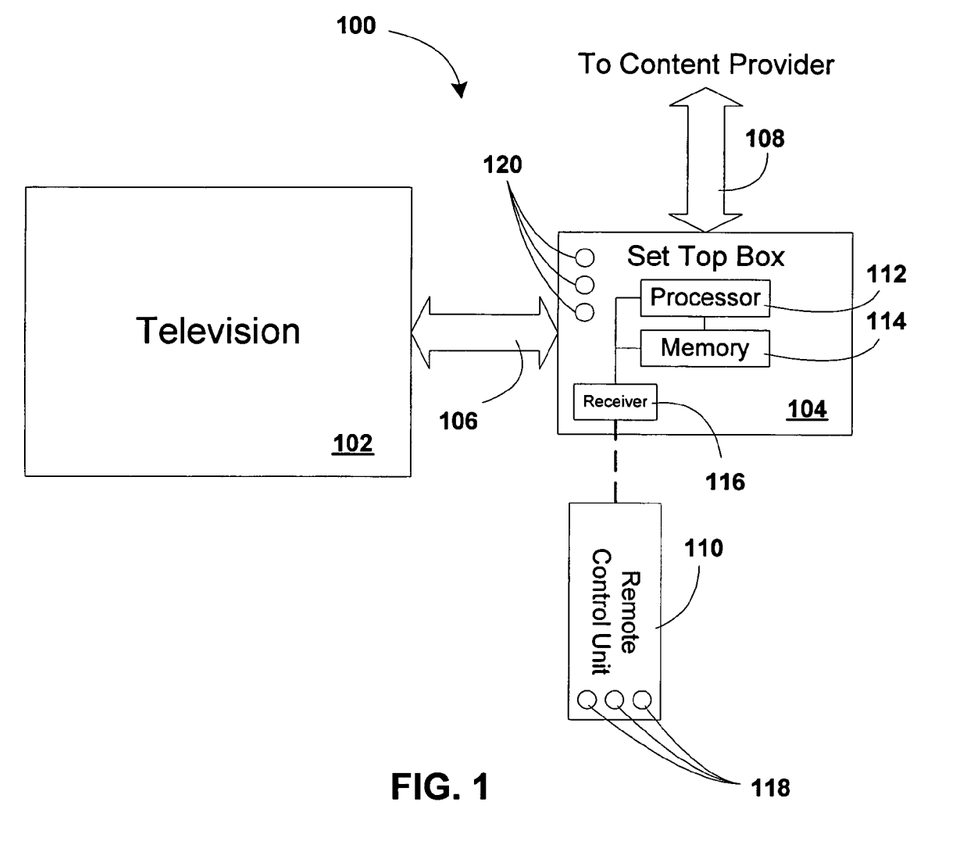
FIG. 1 is a block diagram representative of an entertainment system.

Referring to FIG. 1, a system for managing movies provided at a television is illustrated and is generally designated 100. As illustrated in FIG. 1, in an exemplary, non-limiting embodiment, the system 100 includes a television 102, but it can be appreciated that the system 100 can include any display device on which video content can be displayed. FIG. 1 indicates that a set top box 104 can be connected to the television 102 via a first broadband connection 106. The set top box 104 is also connected to a video content provider, e.g., a cable company or a digital satellite company, via a second broadband connection 108. FIG. 1 also depicts a remote control unit 110 that can communicate with the set top box 104 to allow user interaction with the system 100 during operation. The remote control unit 110 can communicate with the set top box 104 via one or more infrared (IR) signals, or other wireless signals.

As indicated in FIG. 1, the set top box 104 includes a processor 112 in which logic, such as user interface logic, can be executed. Further, the set top box 104 includes a memory 114 in which content from the content provider can be downloaded and stored. FIG. 1 also shows that the set top box 104 can include a receiver 116, e.g., an IR receiver, that is configured to receive one or more IR signals from the remote control unit 110. Moreover, as depicted in FIG. 1, the remote control unit 110 can include a plurality of buttons 118 that can be toggled by a user during operation in order to downloaded protected content, e.g., video files, music files, photographs, etc. FIG. 1 further shows that the set top box 104 can also include a plurality of buttons 120 that can be toggled by a user during operation in order to download protected content.

Figure 2:
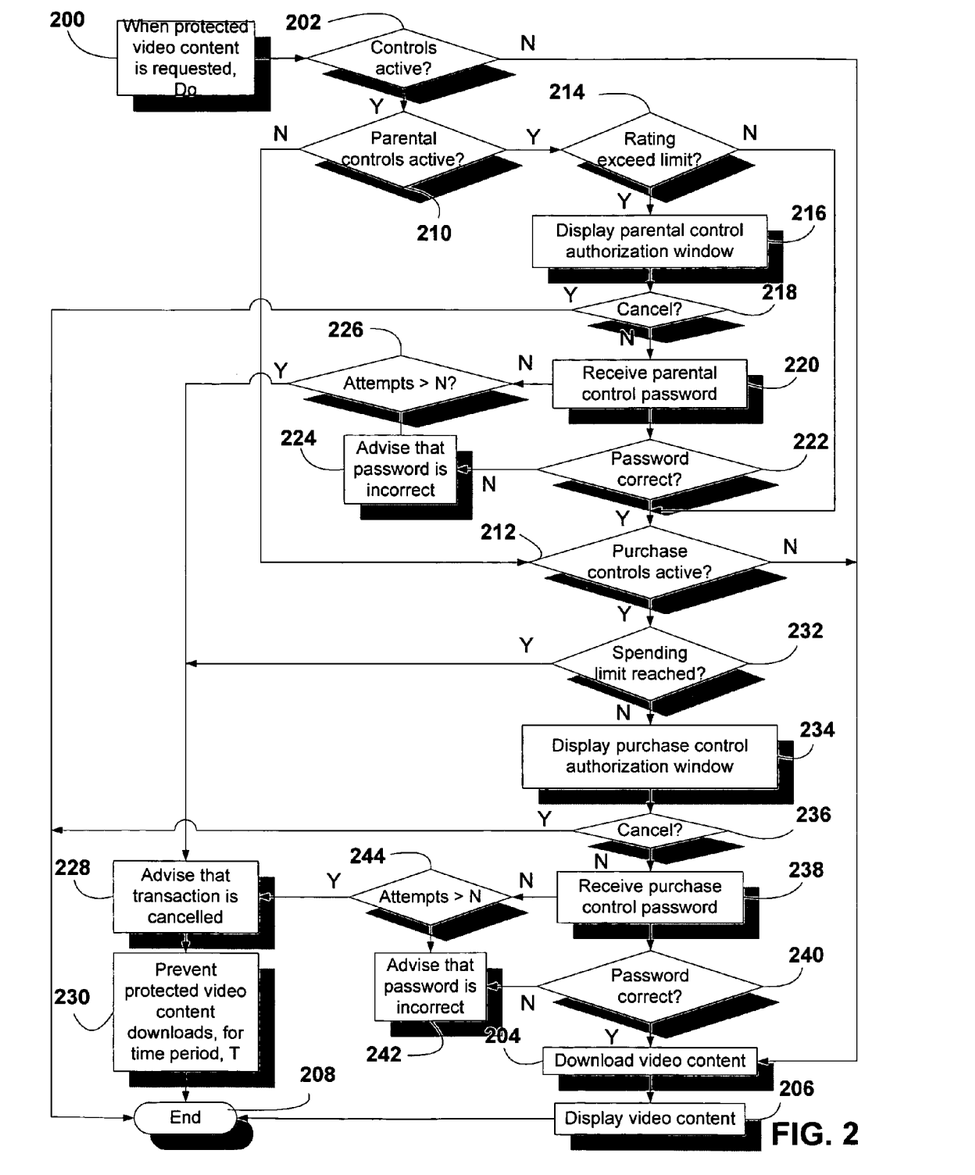
FIG. 2 is a flow chart to illustrate general operating logic that can be used to provide security for acquiring video content.

Referring to FIG. 2, a particular embodiment of operating logic of the system 100 (FIG. 1) is shown and commences at block 200, wherein when protected video content is requested, the succeeding steps are performed. In an illustrative embodiment, the protected video content includes movies that can be stored as video files at the memory 114 (FIG. 1) within the set top box 104 (FIG. 1). Typically, the movies are pre-stored at a content provider and are not live real-time video content. When requested, the movies can be transmitted, e.g., streamed, to the set top box 104 (FIG. 1) and stored at the memory 114 (FIG. 1). In another embodiment, the content can be downloaded to the set top box 104 in its entirety before it is available for viewing at the set top box 104, i.e., the content is not streamed. At step 202, a decision is undertaken in order to determine whether any security controls are active. If there are no active security controls, the logic moves to block 204 and the protected video content is downloaded to the set top box 104 (FIG. 1). At block 206, the protected video content is displayed at the display device 102 (FIG. 1). The logic then ends at state 208.

Returning to step 202, if there are active security controls, the logic proceeds to step 210. At step 210, a decision is made to ascertain if parental controls are active. If parental controls are not active, the logic continues to step 212 and a decision is made to determine whether purchase controls are active. Returning to step 210, if parental controls are active, the logic moves to step 214. At step 214, a determination is made in order to check whether the rating of the protected video content exceeds a limit that is set by a master user, e.g., a parent. The rating of the video content can be a Motion Picture Association of America (MPAA) rating such as G, PG, PG-13, R, NC-17, and NR. Alternatively, the rating can be a V-chip rating or a parent's music resource center rating (PMRC). A master user can set the rating limit used in decision step 214 in order to prevent video content with a rating above the limit from being downloaded to the set top box 104 (FIG. 1). As such, if the rating of the protected video content does not exceed the predetermined limit, the logic continues to step 212 in order to determine if the purchase controls are active.

If the rating of the protected content does exceed the limit imposed by the master user, the logic continues to block 216 and a parental control authorization window is presented. Moving to step 218, a decision is made to determine if the user has cancelled the attempt to download the protected video content. If so the logic ends at state 208.

If the user does not cancel the attempt to download the protected video content, the logic continues to block 220 and a parental control password is received. Next, at step 222, a decision is undertaken in order to determine whether the parental control password is correct. If the password is incorrect, the logic moves to block 224 where the user is advised that the password is incorrect. Then, at step 226 a determination is made to determine whether the number of attempts to input the correct password is greater than a predetermined number of attempts, N. If the number of attempts exceeds the predetermined limit, the logic moves to block 228 and the user is advised that the transaction is cancelled. Proceeding to block 230, protected video content downloads are prevented for a predetermined time period, T, or until a master account holder overrides the security controls and authorizes downloads. In an illustrative embodiment, a master user can set the number of attempts, N, which, if exceeded, will cause the transaction to be cancelled in block 228.

If the password is correct at decision step 222, the logic moves to step 212 and a decision is undertaken in order to determine whether purchase controls are active. If purchase controls are not active, the logic continues to block 204 and continues as described above. On the other hand, if purchase controls are active, the logic proceeds to step 232 and a decision is made in order to ascertain whether a pre-defined spending limit has been reached. In an illustrative embodiment, the spending limit can be imposed by the master user for a period of a week, a month, etc. However, the spending limit can also be imposed by the content provider if a particular customer has had previous difficulty paying for downloads, if the customer has an outstanding unpaid bill, or if the user pre-paid for video content and has exceeded the amount that was pre-paid. If the spending limit has been reached, the logic moves to block 228 and the set top box 104 (FIG. 1) advises that the transaction is cancelled. At block 230, protected video content downloads are prevented for a time period, T, e.g., until payment has been received for previous downloads or until the master account holder overrides the purchase controls. The logic then ends at state 208.

Returning to step 232, if the pre-set spending limit has not been reached, or there is not a pre-set spending limit, the logic continues to block 234 and a purchase control authorization window is displayed. Thereafter, at step 236, a decision is made in order to determine if the user has cancelled the attempt to download the protected content. If so, the logic ends at state 208. Conversely, if the attempt to download the protected content is not cancelled, the logic moves to block 238 and a purchase control password is received by the set top box 104 (FIG. 1).

Continuing to step 240, a determination is made in order to verify the purchase control password. If the password is incorrect, the logic moves to block 242 where the user is advised that the password is incorrect. Then, at step 244 a determination is undertaken in order to determine whether the number of attempts to input the correct password is greater than a predetermined number of attempts, N. If the number of attempts exceeds the predetermined limit, the logic moves to block 228 and continues as described above. If the number of attempts, N, does not exceed the limit, the logic returns to block 238 and another purchase control password is received. The logic then returns to step 240 and continues as described above. At step 240, if the purchase control password is correct, the logic proceeds to step 204 and the video content is allowed to download. The video content can then be displayed at block 206. The logic then ends.

Figure 3:
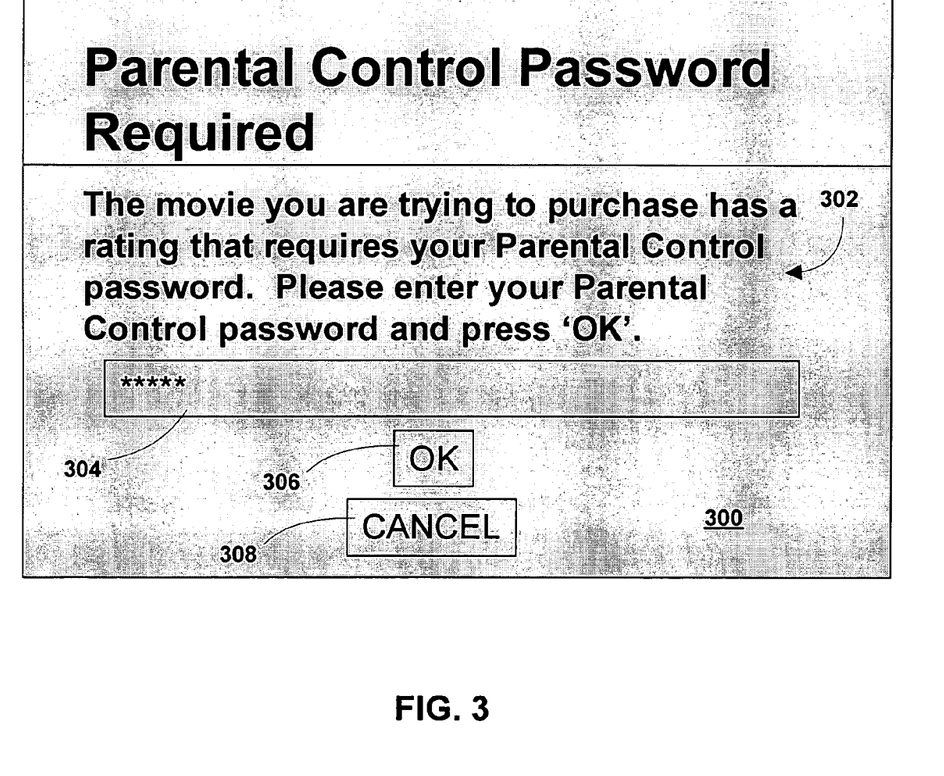
FIG. 3 is a general diagram illustrating a parental control authorization screen.

Referring now to FIG. 3, an exemplary parental control authorization screen is shown and is designated 300. As shown, the parental control authorization screen 300 includes an admonishment to a user 302 that reads, "The movie you are trying to purchase has a rating that requires your Parental Control password. Please enter your Parental Control password and press 'Ok'." Moreover, the parental control authorization screen 300 includes a password input window 304 into which a user can input an alphanumeric password which will allow protected video content above a rating limit to be downloaded. The parental control authorization screen 300 also includes an "Ok" button 306 and a "Cancel" button 308. The "Ok" button 306 can be selected in order to submit the parental control password to the set top box 104 (FIG. 1). The "Cancel" button 308 can be used to cancel the transaction.

Figure 4:
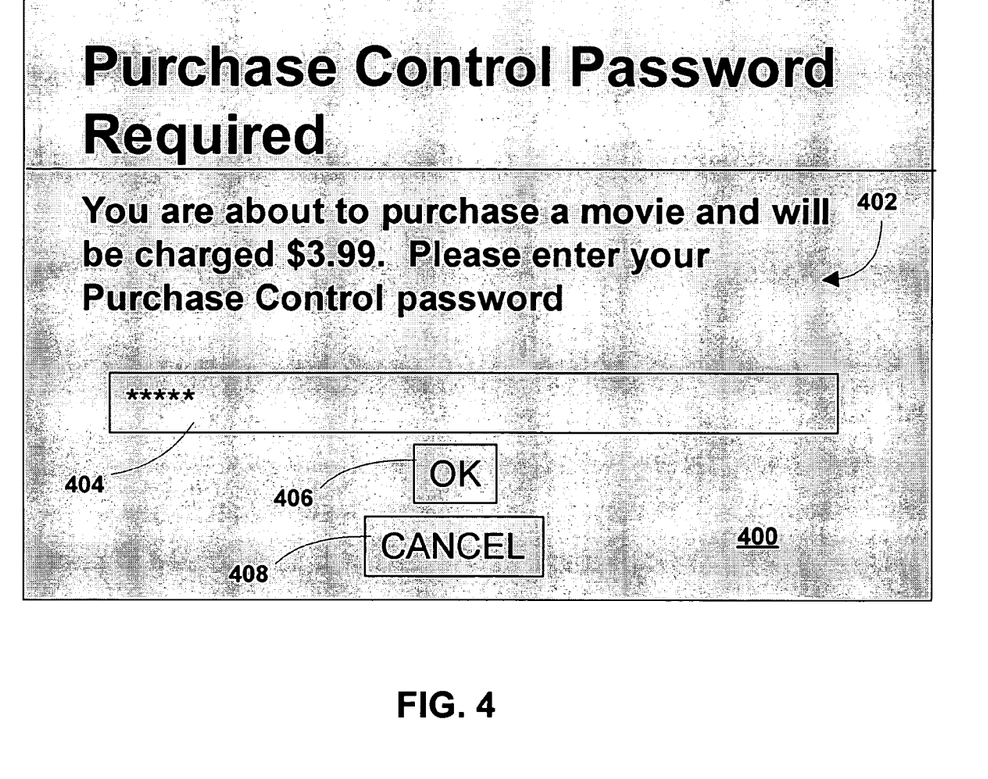
FIG. 4 is a general diagram illustrating a purchase control authorization screen.

FIG. 4 shows an exemplary purchase control authorization screen, which is designated 400. As shown, the purchase control authorization screen 400 includes an admonishment to a user 402 that reads, "You are about to purchase a movie and will be charged $3.99. Please enter your Purchase Control password." Moreover, the purchase control authorization screen 400 includes a password input window 402 into which a user can input an alphanumeric password which will allow protected video content above a rating limit to be downloaded. The purchase control authorization screen 400 also includes an "Ok" button 406 and a "Cancel" button 408. The "Ok" button 406 can be selected in order to submit the purchase control password to the set top box 104 (FIG. 1). The "Cancel" button 408 can be used to cancel the transaction.

In an alternative embodiment, protected music files and protected photographs can be downloaded in addition to protected video files, or instead of protected video files. Moreover, in an alternative embodiment, the content can reside on the set top box 104 and instead of downloading the content, the set top box 104 can unlock the content, or otherwise provide access to the content, before the content is displayed. However, the controls can work the same and prevent access to the content in the same manner as described herein. Moreover, in the case that a user picks the same password for the parental controls and the purchase controls, the system would ask a single combined question for the password.

Figure 5:
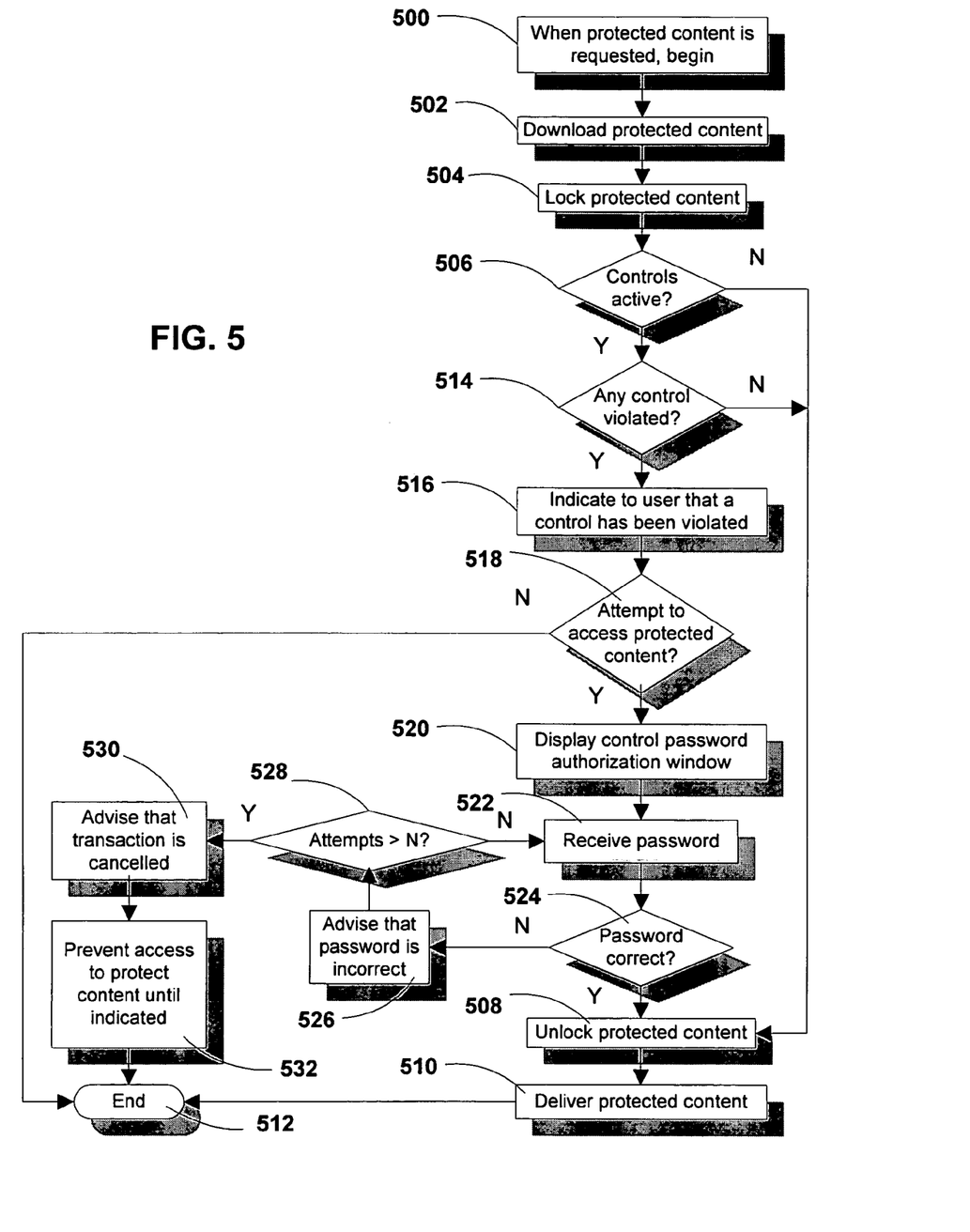
FIG. 5 is a flow chart to illustrate alternative general operating logic that can be used to provide security for acquiring video content.

Referring now to FIG. 5, an alternative embodiment of operating logic of the system 100 (FIG. 1) is shown and commences at block 500 when protected content is requested. At block 502, the protected content is downloaded. The protected content is locked to prevent access at step 504. Moving to decision step 506, a decision is undertaken in order to ascertain whether any security controls are active. If there are no active security controls, the logic moves to block 508 and the protected video content is unlocked at the set top box 104 (FIG. 1). At block 510, the protected video content is delivered to the display device 102 (FIG. 1) where it can be viewed, listened to, etc. The logic then ends at state 512.

At decision step 506, if there are active security controls, the logic continues to step 514. At step 514, a decision is made in order to determine if any of the security controls have been violated 514. If not, the logic moves to block 508 and continues as described above. On the other hand, if any security control has been violated at step 514, the logic moves to block 516 and where the user is indicated that one or more security controls have been violated.

Proceeding to decision step 518, a determination is made in order to ascertain whether an attempt to access protected content has been made. If an attempt is not made to access protected content, the logic ends at state 512. However, if an attempt is made, the logic moves to block 520 and a control password authorization window is displayed, e.g., at the display device 102 (FIG. 1). At block 522, a control password is received. Next, at step 524, a decision is undertaken in order to determine whether the control password is correct. If the password is incorrect, the logic moves to block 526 where the user is advised that the password is incorrect. Then, at step 528 a determination is made to determine whether the number of attempts to input the correct password is greater than a predetermined number of attempts, N. If the number of attempts exceeds the predetermined limit, the logic moves to block 530 and the user is advised that the transaction is cancelled. Proceeding to block 532, access is prevented to protected content until indicated by a master account holder.

At step 528, if the number of attempts does not exceed the threshold, the logic returns to block 522 and a control password is received, again. Thereafter, if the control password is correct at decision step 524, the protected content is unlocked at block 508 and delivered to the display device 102 at block 510. The logic then ends at state 512.

With the configuration of structure described above, the system and method for video content acquisition security provides a flexible way to prevent unauthorized access to protected video content. The system breaks the security into two components: parental control security and purchase control security. The parental control security can allow or prevent access to video content based on the rating it has received from the MPAA, the Federal Communication Commission (FCC) V-chip rating system, the Recoding Industry Association of America (RIAA) rating system, or the parent's music resource center (PMRC) rating system. The access to protected video content is determined by the master account holder and can be set during the setup of the set-top box. The parental controls can be changed at any time by the master account holder or disabled completely.

The purchase control security operates in conjunction with the parental control security. The purchase control security uses password authentication to authorize the charge for downloading protected video content. That charge can be added to the master account holder's bill or a credit card. The purchase controls can be established during the set up process and later changed by the master account holder.

In a particular embodiment, the parental controls are invoked first and once the parental controls are satisfied, or if they are disabled, the purchase controls are invoked, if activated. Once the purchase controls are satisfied, the protected video content can be downloaded to the set top box and stored in the memory. Under each set of controls, if a password entry is attempted and fails a predetermined number of times the transaction can be cancelled. The system can then prevent any additional downloads for a predetermined time period or until a master account holder unlocks the system.

The two-stages of security provided by the present disclosure call allow unlimited downloading of protected video content by de-activating or disabling the parental controls and the purchase controls. Access to all acceptable protected video content can be granted by enabling the parental controls and disabling the purchase controls. Further, if the master account holder is only interested in cost control, the parental controls can be disabled by the master account holder while the purchase controls are enabled. Additionally, if the master account holder wants to allow unlimited downloads of acceptable protect video content, but only to trusted users, the parental controls can be enabled and the purchase control password could be released to the trusted users.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A computer readable storage device including processor-executable instructions that, when executed by a processor, cause the processor to perform operations including:

receiving a request for protected digital video content associated with a user account;

determining whether security controls associated with the user account are active, wherein the security controls include parental controls, purchase controls, or a combination thereof;

initiating a first download of the protected digital video content without streaming in response to determining that the security controls are not active;

determining whether the parental controls are active in response to determining that the security controls are active;

determining whether the purchase controls are active in response to determining that the parental controls are not active;

determining whether a rating associated with the protected digital video content exceeds a rating limit in response to determining that the parental controls are active;

determining whether the purchase controls are active in response to determining that the rating associated with the protected digital video content does not exceed the rating limit;

initiating a first prompt requesting a parental control password in response to determining that the rating associated with the protected digital video content exceeds the rating limit;

receiving a first parental password entry in response to the first prompt;

determining whether the first parental password entry is a correct parental control password;

in response to determining that the first parental password entry is the correct parental control password and a determination that a number of attempts to enter the correct parental control password does not exceed a first entry limit, determining whether the purchase controls are active;

determining whether a spending limit associated with the user account has been reached in response to determining that the purchase controls are active;

initiating a second prompt requesting a purchase control password in response to determining that the spending limit has not been reached;

receiving a first purchase control password entry in response to the second prompt;

determining whether the first purchase control password entry is a correct purchase control password;

in response to determining that the first purchase control password entry is the correct purchase control password and a determination that a number of attempts to enter the correct purchase control password does not exceed a second entry limit, initiating a second download of the protected digital video content without streaming the protected digital video content;

in response to downloading the protected digital video content, storing the downloaded protected digital video content at a memory of a set top box and locking the downloaded protected digital video content after the downloaded protected digital video content is stored at the memory;

detecting an attempt to access the downloaded protected digital video content after the protected video content is locked;

in response to detecting the attempt to access the downloaded protected digital video content that is locked, determining whether the rating associated with the downloaded protected digital video content exceeds the rating limit;

in response to a determination that the rating associated with the downloaded protected digital video content exceeds the rating limit, initiating a third prompt requesting the parental control password;

receiving a second parental password entry in response to the third prompt;

determining whether the second parental password entry is the correct parental control password; and in response to determining that the second parental password entry is the correct parental control password, unlocking the downloaded protected digital video content, wherein the parental control password is different from the purchase control password.

2. The computer readable storage device of claim 1, wherein the operations further include prohibiting protected digital video content downloads for a time period in response to a determination that the spending limit associated with the user account has been reached.

3. The computer readable storage device of claim 1, wherein the operations further include:

detecting the number of attempts to input the correct purchase control password; and determining whether the number of attempts to input the correct purchase control password exceeds the second entry limit.

4. The computer readable storage device of claim 3, wherein the operations further include preventing downloading during a lockout period in response to a determination that the number of attempts to input the correct purchase control password exceeds the second entry limit.

5. The computer readable storage device of claim 4, wherein the operations further include permitting downloading during the lockout period in response to receipt of an authorization by a master account user associated with the account.

6. An apparatus comprising:

a processor; and a memory of a set top box accessible to the processor, the memory including instructions that are executable by the processor to cause the processor to perform operations including:

receiving a request for protected digital video content associated with a user account;

determining whether security controls associated with the user account are active, wherein the security controls include parental controls, purchase controls, or a combination thereof;

initiating a first download of the protected digital video content without streaming in response to determining that the security controls are not active;

determining whether the parental controls are active in response to determining that the security controls are active;

determining whether the purchase controls are active in response to determining that the parental controls are not active;

determining whether a rating associated with the protected digital video content exceeds a rating limit in response to determining that the parental controls are active;

determining whether the purchase controls are active in response to determining that the rating associated with the protected digital video content does not exceed the rating limit;

initiating a first prompt requesting a parental control password in response to a determination that the rating associated with the protected digital video content exceeds the rating limit;

receiving a first parental password entry in response to the first prompt;

determining whether the first parental password entry is a correct parental control password;

in response to determining that the first parental password entry is the correct parental control password and a determination that a number of attempts to enter the correct parental control password does not exceed a first entry limit, determining whether the purchase controls are active;

determining whether a spending limit associated with the user account has been reached in response to determining that the purchase controls are active;

initiating a second prompt requesting a purchase control password in response to determining that the spending limit has not been reached;

receiving a purchase control password entry in response to the second prompt;

determining whether the purchase control password entry is a correct purchase control password;

in response to determining that the purchase control password entry is the correct purchase control password and a determination that a number of attempts to enter the correct purchase control password does not exceed a second entry limit, initiating a second download of the protected digital video content without streaming the protected digital video content;

in response to downloading the protected digital video content, storing the downloaded protected digital video content at the memory and locking the downloaded protected digital video content after the downloaded protected digital video content is stored at the memory;

detecting an attempt to access the downloaded protected digital video content after the protected video content is locked;

in response to detecting the attempt to access the downloaded protected digital video content that is locked, determining whether the rating associated with the downloaded protected digital video content exceeds the rating limit;

in response to a determination that the rating associated with the downloaded protected digital video content exceeds the rating limit, initiating a third prompt requesting the parental control password;

receiving a second parental password entry in response to the third prompt;

determining whether the second parental password entry is the correct parental control password; and in response to determining that the second parental password entry is the correct parental control password, unlocking the downloaded protected digital video content, wherein the parental control password is different from the purchase control password.

7. The apparatus of claim 6, wherein the operations further comprise:

determining the number of attempts to input the correct purchase control password; and blocking the second download of the protected digital video content for a time period in response to the number of attempts exceeding the second entry limit.

8. The apparatus of claim 6, wherein the operations further comprise prohibiting downloading the protected digital video content for a time period based on the spending limit being reached.

9. A method comprising:

receiving a request for protected digital video content associated with a user account, the user account associated with a set-top box;

determining whether security controls associated with the user account are active, wherein the security controls include parental controls, purchase controls, or a combination thereof;

initiating a first download of the protected digital video content without streaming in response to determining that the security controls are not active;

determining whether the parental controls are active in response to determining that the security controls are active;

determining whether the purchase controls are active in response to determining that the parental controls are not active;

determining whether a rating associated with the protected digital video content exceeds a rating limit in response to determining that the parental controls are active;

determining whether the purchase controls are active in response to determining that the rating associated with the protected digital video content does not exceed the rating limit;

initiating a first prompt requesting a parental control password in response to a determination that the rating associated with the protected digital video content exceeds the rating limit;

receiving a first parental password entry in response to the first prompt;

determining whether the first parental password entry is a correct parental control password;

in response to determining that the first parental password entry is the correct parental control password and a determination that a number of attempts to enter the correct parental control password does not exceed a first entry limit, determining whether the purchase controls are active;

determining whether a spending limit associated with the user account has been reached in response to determining that the purchase controls are active;

initiating a second prompt requesting a purchase control password in response to determining that the spending limit has not been reached;

receiving a purchase control password entry in response to the second prompt;

determining whether the purchase control password entry is a correct purchase control password;

in response to determining that the purchase control password entry is the correct purchase control password and a determination that a number of attempts to enter the correct purchase control password does not exceed a second entry limit, initiating a second download of the protected digital video content without streaming the protected digital video content;

in response to downloading the protected digital video content, storing the downloaded protected digital video content at a memory of a set top box and locking the downloaded protected digital video content after the protected digital video content is stored at the memory;

detecting an attempt to access the downloaded protected digital video content after the downloaded protected digital video content is locked;

in response to detecting the attempt to access the downloaded protected digital video content that is locked, determining whether the rating associated with the downloaded protected digital video content exceeds the rating limit;

in response to a determination that the rating associated with the downloaded protected digital video content exceeds the rating limit, initiating a third prompt requesting the parental control password;

receiving a second parental password entry in response to the third prompt;

determining whether the second parental password entry is the correct parental control password; and unlocking the downloaded protected digital video content in response to determining the second parental password entry is the correct parental control password, wherein the parental control password and the purchase control password are different.

10. The method of claim 9, wherein the spending limit is imposed for a predetermined amount of time.

11. The apparatus of claim 6, wherein the spending limit is imposed by a content provider when the account has an outstanding unpaid balance.

12. The apparatus of claim 6, wherein the operations further comprise preventing downloading the protected digital video content, based on the spending limit, until a balance associated with the user account is a zero balance.

13. The computer readable storage device of claim 1, wherein the operations further include prohibiting downloading the protected digital video content for a time period in response to the number of attempts to input the correct parental control password in response to the first prompt exceeding the first entry limit, wherein the time period is selected based on a master account user input.

14. The computer readable storage device of claim 1, wherein locking the downloaded protected digital video content prevents access to the downloaded protected digital video content when the security controls are active.

15. The computer readable storage device of claim 14, wherein unlocking the downloaded protected digital video content enables access to the downloaded protected digital video content.

16. The computer readable storage device of claim 14, wherein the operations further include initiating display of the downloaded protected digital video content after the downloaded protected digital video content is unlocked at the memory.

17. The computer readable storage device of claim 1, wherein the operations further include:

in response to determining that the first parental password entry is not the correct parental password, providing an indication of an incorrect parental password; and initiating a fourth prompt requesting the parental control password in response to the determination that the number of attempts to enter the correct parental control password does not exceed the first entry limit.

18. The computer readable storage device of claim 17, wherein the operations further include:

receiving a third parental password entry in response to the fourth prompt; and determining whether the third parental password entry is the correct parental control password.

19. The computer readable storage device of claim 18, wherein the operations further include determining whether the purchase controls are active in response to determining that the third parental password entry is the correct parental control password and that the number of attempts to enter the correct parental control password does not exceed the first entry limit.

20. The computer readable storage device of claim 1, wherein the first entry limit and the second entry limit are set based on a master account user input associated with the user account.

21. The apparatus of claim 6, wherein an entirety of the protected digital video content is stored and locked at the memory prior to the attempt to access the downloaded protected digital video content, and wherein the memory is associated with the set top box.

22. The apparatus of claim 6, wherein the rating limit is set based on a master account user input associated with the user account.

* * * * *